W. J. O. LAVALLEE.
CLUTCH MECHANISM.
APPLICATION FILED JAN. 27, 1919.

1,334,103.

Patented Mar. 16, 1920.
2 SHEETS—SHEET 1.

Inventor
W.J.O. Lavallee
By
Atty.

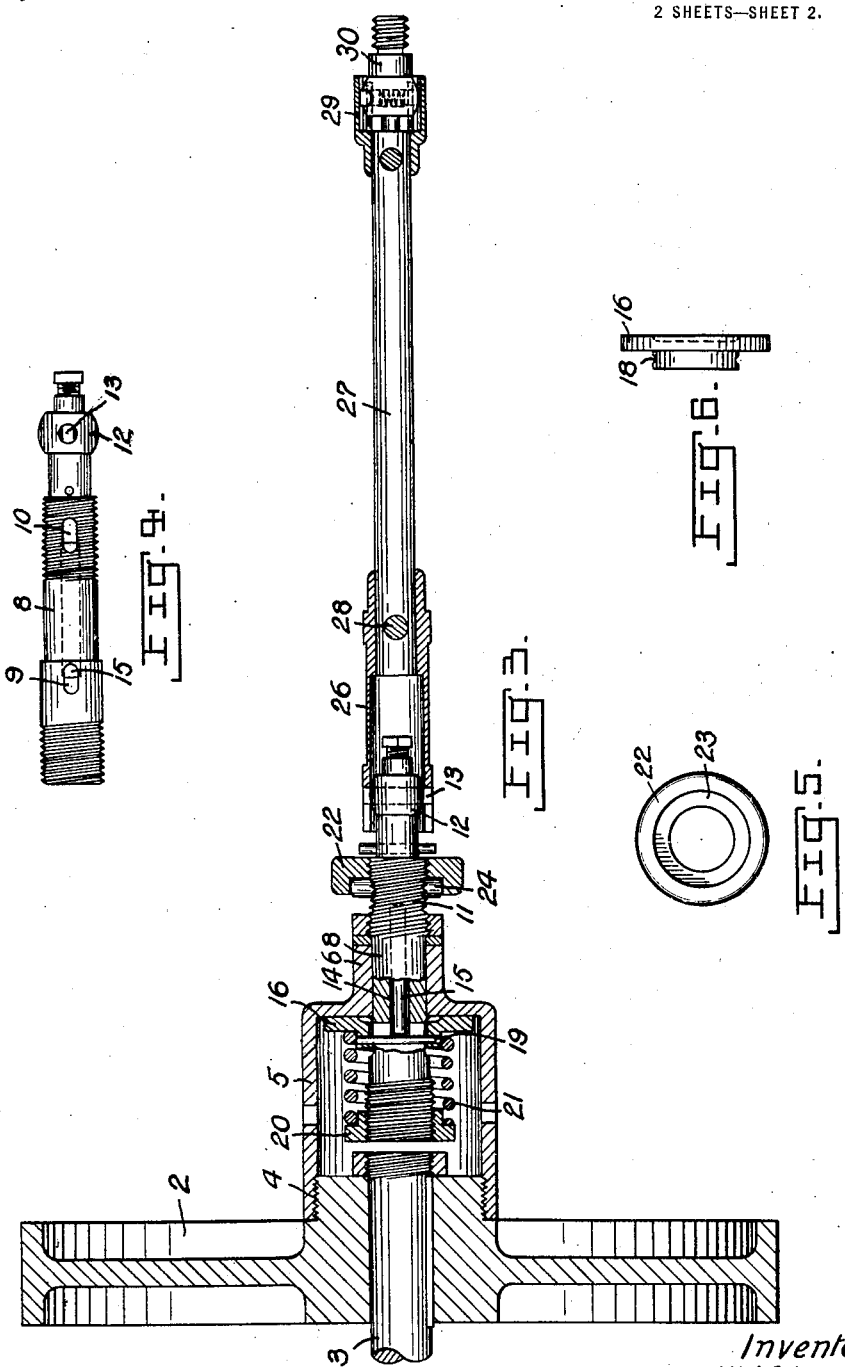

UNITED STATES PATENT OFFICE.

WILFRID JOSEPH OSCAR LAVALLEE, OF MONTREAL, QUEBEC, CANADA.

CLUTCH MECHANISM.

1,334,103.  Specification of Letters Patent.  Patented Mar. 16, 1920.

Application filed January 27, 1919. Serial No. 273,403.

*To all whom it may concern:*

Be it known that I, WILFRID JOSEPH OSCAR LAVALLEE, residing at 188ª Christophe Colomb, in the city of Montreal, Province of Quebec, Dominion of Canada, have invented certain new and useful Improvements in Clutch Mechanism; and I do hereby declare that the following is a full, clear, and exact description of the same.

The present invention relates to improvements in clutch mechanism for connecting and disconnecting a cream separator with and from a motor or engine.

The main object of the invention is to provide an attachment of this character whereby a continuous rotation of the separator may be obtained direct from the engine without altering or modifying their shape.

A further object is to provide a driving connection of the character indicated, which may be uncoupled to stop the separator by a simple mechanical device.

Another object is to devise an attachment of this character that may be applied for many purposes other than for operating a cream separator, as well as being of a simple construction and particularly cheap to manufacture.

The invention will be better understood with the aid of the accompanying drawings in which:

Fig. 3 is an enlarged horizontal cross section through the attachment.

Fig. 4 is a top view of the operating shaft.

Fig. 5 is a front view of the operating clutch member.

Fig. 6 is a side view of the clutch member.

Like numerals of reference indicate corresponding parts in each figure.

Figure 1:
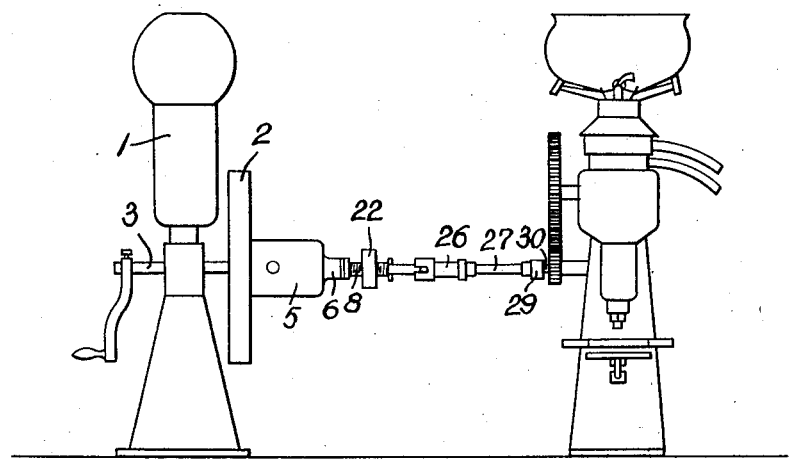
Figure 1 is a view in side elevation, showing the improved driving attachment in use.
Figure 2:
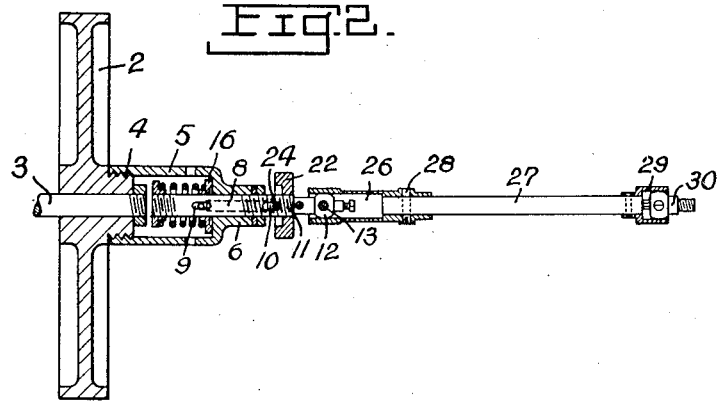
Fig. 2 is a longitudinal vertical cross section through the attachment.

In the drawings 1 is an internal combustion engine and 2 is a fly wheel mounted on the crank shaft 3 and which is provided with an outward projecting threaded hub 4. Threaded on said hub 4 is a tubular casing 5. The said casing 5 is provided in turn, with an axially disposed hub or collar 6, the bore of which receives a shaft 8 which projects within the casing 5 and is arranged in line with the crank shaft 3, said shaft 8 being threaded at this end and provided with two slots 9 and 10 at a convenient distance from one another and with an intermediate threaded portion 11 between them. The other end of the shaft 8 terminates in an enlarged portion 12 provided with a transverse hole in which is inserted a locking pin 13. The shaft 8 is also centrally bored at 14 to receive the push rod 15 which is normally positioned between the two slots 9 and 10.

Inside the casing 5 mounted on said shaft 8 is provided a clutch member 16 in the form of a friction disk which is adapted to abut against the inner end of the casing 5. 18 is a hole provided in the hub of this disk or member 16 to receive the pin 19 which passes through the slot 9 in the shaft 8, thereby locking said clutch member 16 on said shaft and permitting it to have merely a limited sliding movement. On the inner end of said shaft 8 is threaded a flanged head or disk 20; and 21 is a spiral spring around said shaft 8 abutting at one end against said head 20 and at the other end against the clutch member 16, thereby normally holding said clutch member in frictional engagement with the casing 5. 22 is the clutch operating member consisting of a disk having a recessed face 23, said disk being centrally bored and threaded to engage the threaded portion 11 on the shaft 8. The recessed portion 23 of the disk 22 receives in it a cross pin 24 which passes through the slot 10 but has a longitudinal movement limited by the said slot 10.

It will readily be seen that on turning the member 22 in the proper direction it will move forward along shaft 8, carrying with it the pin 24 which is thereby brought in contact with the rod 15 and pushes the same ahead. The rod 15 on being pushed forward will engage the pin 19 and carry the clutch 16 out of engagement with the casing 5, at the same time compressing the spiral spring 21. When the clutch is not engaged with the casing 5 it is evident that the said casing will turn loosely on shaft 8. In performing the reverse operation the shaft 8 is made to turn with the casing 5.

At the outward end of the shaft 8 is provided a hollow shaft or sleeve 26; and 27 is a rod secured to one end of said sleeve 26 by the pin 28. The other end of said sleeve 26 slides over the enlarged portion 12 of shaft 8 and is maintained in position by pin 13. Said rod 27 is provided with a ratchet casing 29 at its other end; and 30 is a ratchet terminal screwed to the driving pinion on the cream separator.

The object of the ratchet connection between the rod 27 and the driving pinion of the cream separator is to prevent abrupt stoppage which might damage the separator.

What I claim as my invention is:

1. In a clutch mechanism, the combination of a rotary driving element; a shaft disposed in line with the axis of said element and formed with front and rear cross-slots and an axial bore connecting them; a clutch member slidable on said shaft; a spring normally holding said clutch member in frictional engagement with said driving element to rotate with the latter and transmit its rotary movement to the shaft; a pin extending loosely through the front cross-slot and anchored at its ends to the clutch member to attach the same to said shaft; a pin extending loosely through the rear cross-slot; a push rod slidable in the bore of said shaft between said pins; and a member on said shaft for pushing the rear pin against said rod, and the latter against the front pin, so as to force the clutch member forwardly out of engagement with the driving element.

2. In a clutch mechanism, the combination of a rotary driving element; a shaft disposed in line with the axis of said element and formed with front and rear cross-slots and an axial bore connecting them, the portion of the shaft through which the rear slot opens being exteriorly threaded; a clutch member slidable on said shaft; a spring normally holding said clutch member in frictional engagement with said driving element to rotate with the latter and transmit its rotary movement to the shaft; a pin extending loosely through the front cross-slot and anchored at its ends to the clutch member to attach the same to said shaft; a pin extending loosely through the rear cross-slot; a push rod slidable in the bore of said shaft between said pins; and a disk rotatably mounted on the threaded portion of said shaft and having a recessed face to receive the rear pin, so as to push said pin against the rear end of the rod, and the latter against the front pin and thereby force the clutch member forwardly out of engagement with the driving element.

3. In a clutch mechanism, the combination of a rotary driving element having a hollow casing fixed to it and formed with a central bearing opening; a shaft projecting through said opening into said casing, and having front and rear cross-slots, the front slot being disposed within the casing and the rear slot exterior thereof, and an axial bore connecting said slots, the portion of the surface of the shaft through which the rear slot opens being exteriorly threaded; a clutch member within said casing slidably mounted on the projecting end of said shaft; a spring normally holding said clutch member in frictional engagement with the casing, so as to rotate with the latter and transmit rotary movement of the casing to the shaft; a pin extending loosely through the front cross-slot and anchored at its ends to the clutch member to connect the same to the shaft; a push rod slidably mounted in the bore of said shaft; a pin extending loosely through the rear cross-slot; and a member rotatably mounted on the threaded portion of said shaft for pushing the rear pin forward against the push-rod, and the latter against the front pin, so as to force the clutch member out of engagement with the casing.

Signed at Montreal, Canada, this 20th day of January 1919.

WILFRID JOSEPH OSCAR LAVALLEE.

Witnesses:
A. Des Rosiers,
A. P. Deal.